United States Patent [19]
Marandi

[11] Patent Number: 5,230,366
[45] Date of Patent: Jul. 27, 1993

[54] AUTOMATIC FLUID FLOW CONTROL DEVICE

[75] Inventor: Ali Marandi, Irvine, Calif.

[73] Assignee: Griswold Controls, Irvine, Calif.

[21] Appl. No.: 911,206

[22] Filed: Jul. 9, 1992

[51] Int. Cl.$^5$ .............................................. F16K 27/00
[52] U.S. Cl. ..................................... 137/613; 137/549
[58] Field of Search .............................. 137/549, 613

[56] References Cited

U.S. PATENT DOCUMENTS

| | | |
|---|---|---|
| 1,949,106 | 2/1934 | Manneschmidt, Jr. . |
| 2,301,976 | 11/1942 | Schellens . |
| 2,517,498 | 8/1950 | McGrath . |
| 2,519,805 | 8/1950 | Williams ........................ 137/549 X |
| 2,775,259 | 12/1956 | Stiebel . |
| 3,106,937 | 10/1963 | Sands . |
| 3,351,281 | 11/1967 | Keil ................................. 137/549 X |
| 3,748,837 | 7/1973 | Billeter ........................... 137/549 X |
| 3,752,183 | 8/1973 | Griswold . |
| 3,837,358 | 9/1974 | Zieg et al. . |
| 4,333,495 | 6/1982 | Griswold ........................ 137/512 X |
| 4,776,365 | 10/1988 | Bathrick et al. ................. 137/549 X |
| 5,031,661 | 7/1991 | Feug ................................ 137/613 X |

FOREIGN PATENT DOCUMENTS

| | | | |
|---|---|---|---|
| 1804340 | 5/1970 | Fed. Rep. of Germany ...... 137/549 |
| 202038 | 7/1939 | Switzerland ......................... 137/549 |

OTHER PUBLICATIONS

Flow Design, Inc., "AUTOFLOW—Automatic Flow Control Valves," May 1991 pp. 1-13.
Flow Design, Inc., "HandiBall Hook Up Assemblies," Jun. 1989, (10 pages).

Primary Examiner—John C. Fox
Attorney, Agent, or Firm—Lyon & Lyon

[57] ABSTRACT

The device of the present application, an automatic flow control device, provides means for maintaining a constant flow rate of strained fluid despite varying differential pressures and employs a combination of a unitary body with a ball valve assembly, a strainer assembly, and a flow control valve assembly. The unitary body is essentially in the shape of a "Z" and provides a compact valve with minimum threaded joints and access to the various components thereof with minimum disassembly.

6 Claims, 3 Drawing Sheets

AUTOMATIC FLUID FLOW CONTROL DEVICE

FIELD OF THE INVENTION

The present invention relates to fluid flow control devices, particularly automatic fluid flow control devices.

BACKGROUND

Fluid flow control assemblies of the prior art generally comprise two or more components. The components, as many as six or more, are pieced together in series. The assemblies require many joints, usually threaded, and usually have relatively long lengths. These are major drawbacks of the prior art assemblies because the more threaded joints a device has, the longer it takes to install the device and the higher the risks of leaks occurring in the device. In addition, the longer the length of a device, the more installation room it requires.

SUMMARY OF THE INVENTION

The automatic fluid flow control device of the present invention includes, among other things, a ball valve which provides means for controlling gross fluid flow through the device, a strainer member for straining fluids upon entering the device, and a pressure compensating flow control valve which provides for constant fluid flow through and out of the device. These features are provided in a compact assembly which allows easy access to each of the features for cleaning and/or replacing and which embodies the device of the present invention.

The novel design and construction of an automatic fluid flow control device according to the present invention provides a singular body which minimizes both: (1) the number of threaded joints (thereby minimizing the time it takes to install the device and the risks of leaks in the device); and (2) the size of the device (thereby minimizing the space need for installation).

Accordingly, a principal object of this invention is to provide an improved automatic fluid flow control device.

Another object of this invention is to provide an automatic fluid flow control device which has a minimum of threaded joints.

Still another object of this invention is to provide an automatic fluid flow control device which has a compact size.

It is a further object of this invention to provide an automatic fluid flow control device comprising a singular body.

An additional object of this invention is to provide an improved automatic fluid flow control device which is configured to provide easy access to various elements and features comprising the device.

It is also an object of this invention to provide strained liquid at a selected flow rate regardless of the pressure of the liquid supplied.

The present invention relates to a fluid flow control device which provides a constant fluid flow even though a variety of supplied pressures occur. The configuration of the body of the device provides for a compact size and easy access to various features of the device including a ball valve, a fluid strainer, and a flow control valve. The device also includes access ports which provide for testing the pressure and/or temperature in the device at various locations.

These features of the present invention are arranged such that when fluid flows into the device, it first encounters a positionable ball valve. The ball valve, depending on its position, either prevents the fluid from entering the rest of the device or allows the fluid to flow into the rest of the device. If the fluid flows into the rest of the device, it then encounters a fluid strainer member.

The fluid strainer member strains and filters the fluid for preventing contaminants from entering the rest of the device and/or exit from the device. The fluid strainer member is easily accessible and may be easily removed to allow for cleaning and/or replacement. Once the fluid passes through the strainer, it encounters an automatic flow control valve.

The automatic flow control valve provides for a constant fluid flow rate despite a varying differential pressure. A variety of flow control cartridges may be used in the flow control valve depending on the flow rate desired. Suitable automatic flow control cartridges are available from Griswold Controls, Irvine, Calif., which may be of the type disclosed in U.S. Pat. No. 3,752,183. Once the fluid passes through the flow control valve, it exits the device at a selected flow as determined by the cartridge used.

DETAILED DESCRIPTION OF THE PREFERRED EMBODIMENT

Figures 1A, 1B:
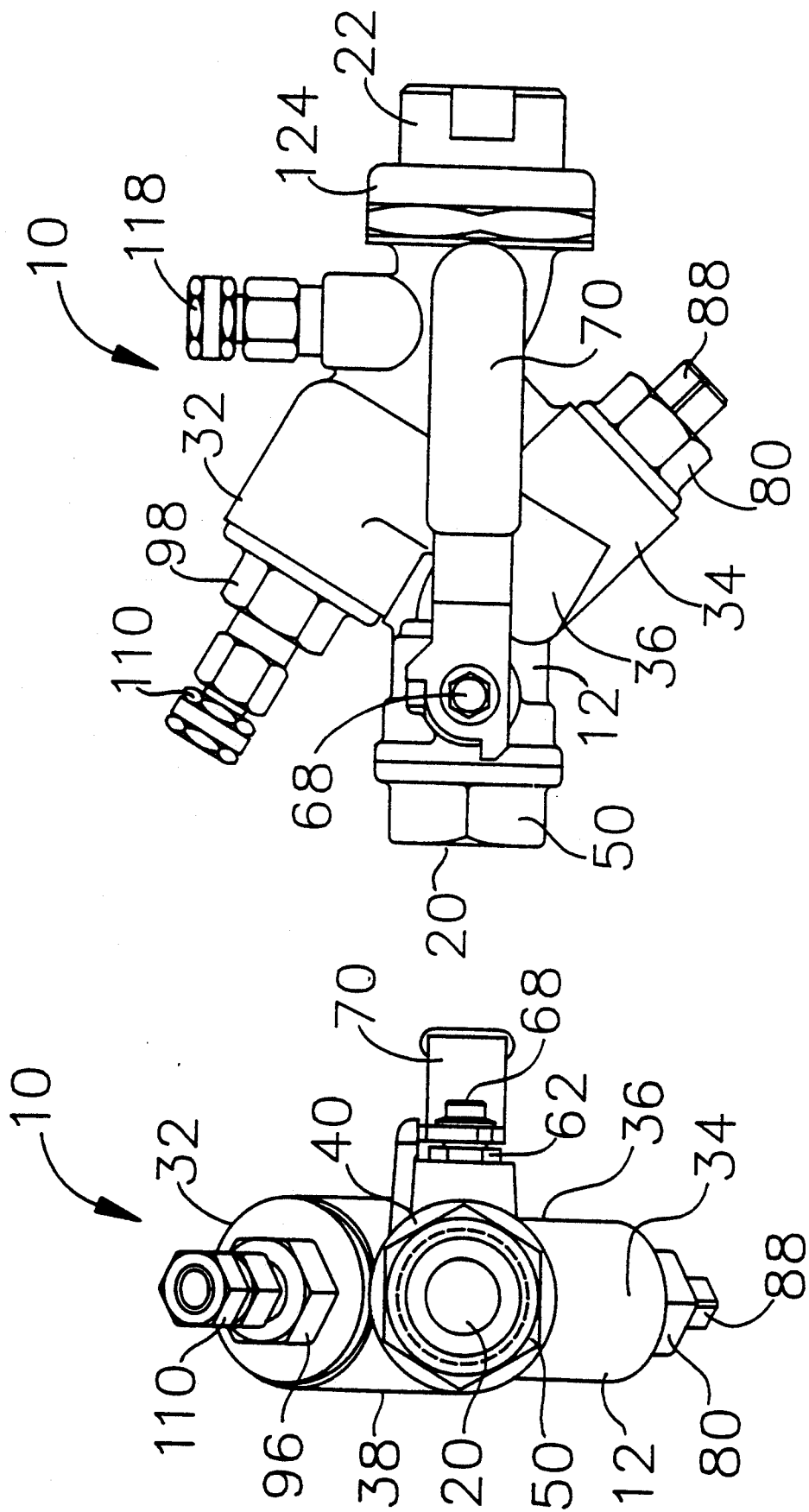
FIG. 1A is an elevational view of the front of an assembled preferred embodiment of an automatic fluid flow control device of the present invention.
FIG. 1B is an elevational view of the left side of the device of FIG. 1A.
Figure 2:
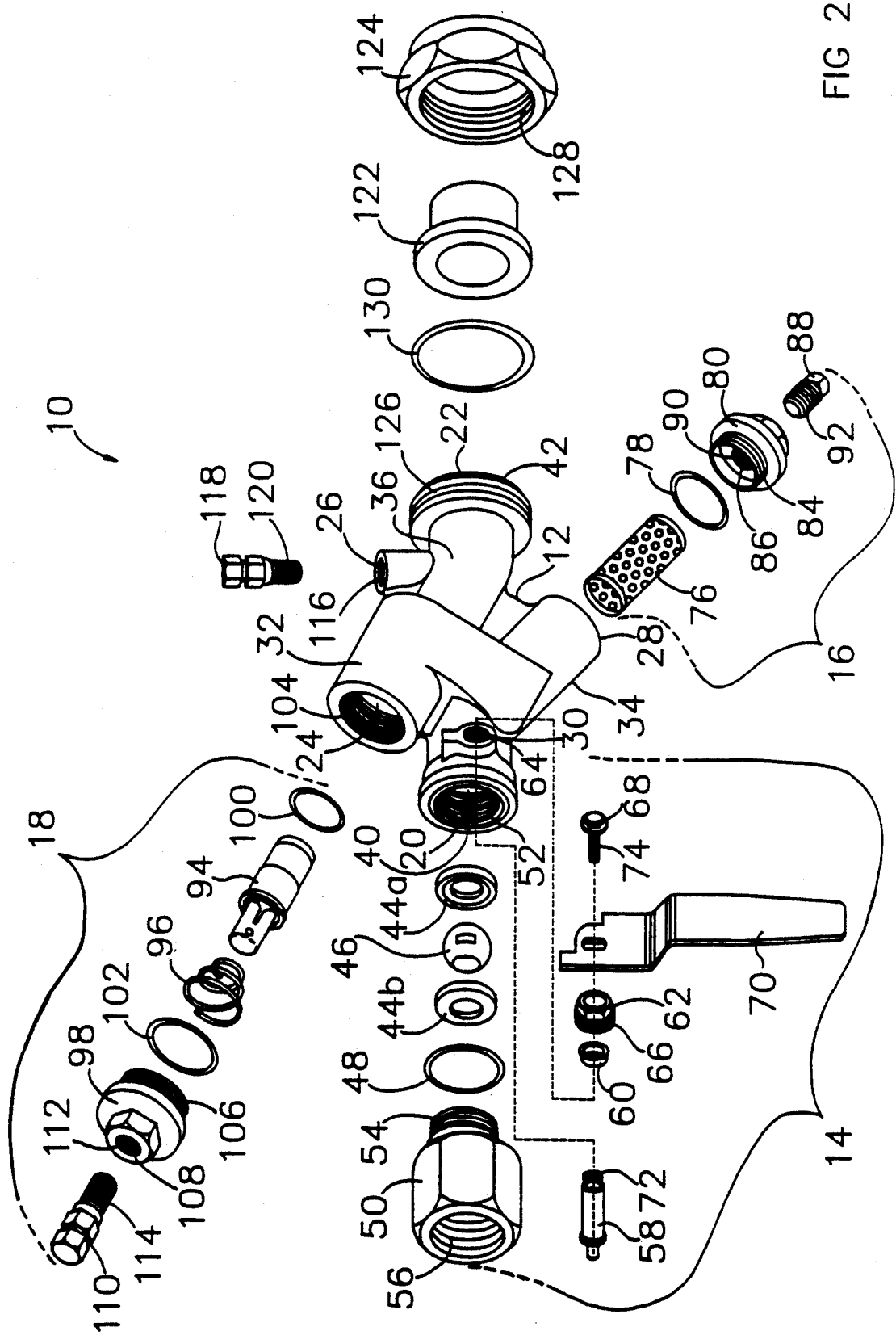
FIG. 2 is an exploded view of the device of FIG. 1A showing the components of the device and their spacial relationship.
Figure 3:
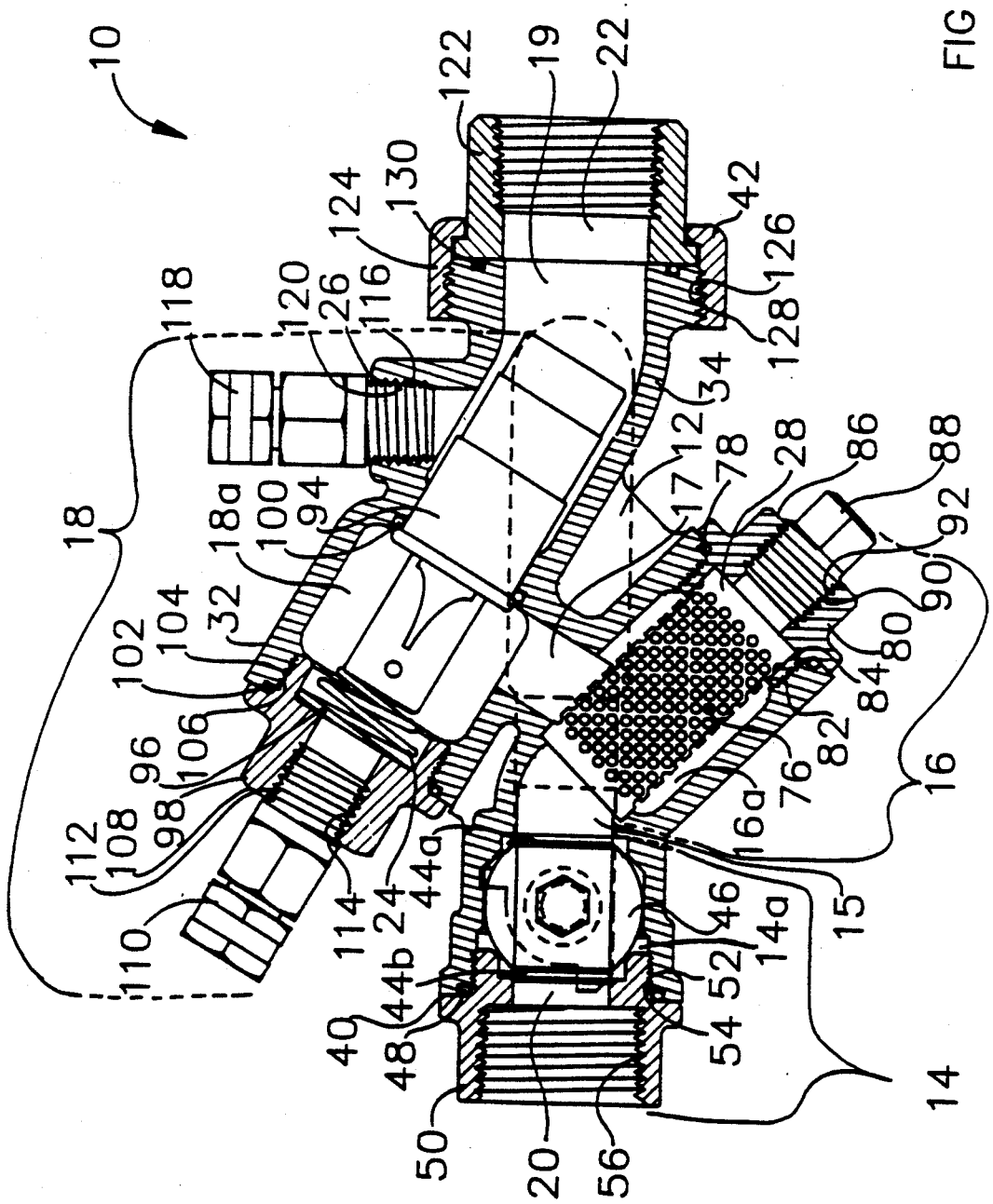
FIG. 3 is a cross-sectional view illustrating the internal configuration of the device of FIG. 1A.

Turning to the drawings, FIG. 1A, 1B, 2, and 3 show a preferred embodiment of the present invention in the form of an automatic fluid flow control device 10. As best shown in FIGS. 2 and 3, the device 10 comprises four main components: a valve body 12, a positionable ball valve assembly 14, a removable strainer assembly 16, and a removable flow control valve assembly 18.

As best shown in FIG. 2, the valve body 12 includes six orifices: an inlet orifice 20, an outlet orifice 22, a flow control valve orifice 24, a test valve orifice 26, a strainer orifice 28, and a ball valve fitting orifice 30. The valve body 12 also includes: a top side 32, a bottom side 34, a front side 36, a back side 38 (FIG. 1B), a left side 40, and a right side 42.

Furthermore, as shown in FIG. 3, the valve body 12 comprises several internal channels for directing fluid flow through the device 10. These channels include: a ball valve channel 14a; a ball valve-strainer connecting channel 15; a strainer channel 16a; a strainer-flow control valve connecting channel 17; a flow control valve channel 18a; and an outlet channel 19. When the device 10 is assembled, as in FIG. 3, the ball valve channel 14a comprises the location of the ball valve assembly 14, the strainer channel 16a comprises the location of the strainer assembly 16, and the flow control valve channel 18a comprises the location of the flow control valve assembly 18. The channels 14a, 15, 16a, 17, 18a, and 19, together form a fanciful backwards "Z" configuration with channels 19 and 18a comprising a top arm of the Z, channel 17 comprising a body of the Z, and channels 16a, 15, and 14a comprising a bottom arm of the Z.

A general description of the positioning and operation of the device 10 will be helpful to understanding the detailed description of the device 10 given below. The device 10 is connected between two pipes or lines with the ball valve fitting orifice 20 attached to a pipe or line which is to be regulated and the outlet orifice 22 is attached to on outlet pipe. Turning to FIG. 3, the general operation of the device 10 involves the following seven steps:

(1) A fluid flow of varying pressures enters the device 10 through the inlet orifice 20 at the left side 40.

(2) The fluid flow encounters the ball valve assembly 14 which, depending upon its position, either allows the fluid to enter or prevents the fluid from entering the device 10.

(3) If the fluid enters the device 10, it then passes through the connecting channel 15 to the strainer assembly 16.

(4) The fluid flow passes through the strainer assembly 16 which strains debris out of the fluid flow so it neither passes through nor out of the rest of the device 10 particularly the removable flow control valve assembly 18.

(5) The strained fluid then passes through the connecting channel 17 to the flow control valve assembly 18.

(6) The flow control valve assembly 18 automatically regulates the fluid flow such that the fluid exits the valve assembly 18 at a constant, pre-selected, rate.

(7) The strained and regulated fluid flow then passes through the outlet channel 19 and the outlet orifice 22, and exits the device 10.

Thus, the device 10 provides automatically controlled fluid flow from fluid supplied at varying pressures in a very compact and simple apparatus.

Turning to the Figures, the device 10, and particularly the configuration of the valve body 12, in more detail, the inlet orifice 20 and the outlet orifice 22, located on the left 40 and right 42 sides of the valve body 12 respectively, comprise openings in the valve body 12 and respectively define a ball valve channel 14a and an outlet channel 19 which are aligned on a common axis and oppositely faced. The flow control valve orifice 24 comprises an opening on the top side 32 of the valve body 12 and defines a flow control valve channel 18a which is acutely angled upward from the common axis toward the inlet orifice 20. The test valve orifice 26 comprises an opening on the top side 32 of the valve body 12 which is upwardly angled from the common axis at approximately a ninety degree angle and is located between the flow control valve orifice 24 and the outlet orifice 22.

The strainer orifice 28 comprises an opening on the bottom side 34 of the valve body 12 and defines a strainer channel 16a which is acutely angled downward from the common axis toward the outlet orifice 22. The ball valve fitting orifice 30 comprises an opening on the front side 36 of the valve body 12 which is outwardly angled from the common axis at approximately a ninety degree angle and is located on the ball valve channel 14a between the inlet orifice 20 and the connector channel 15.

As shown in FIGS. 2 and 3, the ball valve assembly 14 comprises a conventional isolation ball valve arrangement assembled in the ball valve channel 14a of the valve body 12 near the inlet orifice 20. Two packing washers 44a and 44b are placed in the ball valve channel 14a of the valve body 12 through the inlet orifice 20 with a ball valve 46 movably seated between them. The ball valve 46 is movable from an open position to a closed position and vice versa by a handle 70 to be described later. An inlet fitting 50 holds the packing washers 44a and 44b and the ball valve 46 in place in the channel 14a of the valve body 12. The inlet orifice 20 of the valve body 12 has inner threads 52 and inlet fitting 50 has matching outer threads 54 for attaching the inlet fitting 50 to the valve body 12. The inlet fitting 50 also has inner threads 56 for attaching the device 10 to an inlet pipe (not shown). The inlet fitting may be any one of a variety of sizes to connect to a variety of sizes of inlet pipes. The packing washers 44a and 44b and a ring 48 provide tight seals between: (1) the valve body 12 and the ball valve 46; (2) the ball valve 46 and the inlet fitting 50; and (3) the inlet fitting 50 and the valve body 12.

In addition, a shaft 58 engages the ball valve 46 through the ball valve fitting orifice 30. A washer 60 and a fitting 62 hold the shaft 58 in place. The ball valve fitting orifice 30 has inner threads 64 and fitting 62 has matching outer threads 66 for attaching the fitting 62 to the valve body 12. Furthermore, a screw 68 attaches a handle 70 to the shaft 58 thereby providing means for manipulating the position of the shaft 58 thereby manipulating the position of the ball valve 46. The shaft 58 has inner threads 72 and the screw 68 has matching outer threads 74 for attaching the screw 68 (and the handle 70) to the shaft 58.

Also shown in FIGS. 2 and 3, the strainer assembly 16 comprises a strainer 76 which is placed in the strainer channel 16a of the valve body 12 through the strainer orifice 28 and is held in place in the strainer channel 16a by a threaded cap 80. The strainer orifice 28 has inner threads 82 and the threaded cap 80 has matching outer threads 84 for attaching the threaded cap 80 to the valve body 12 thereby holding the strainer 76 in the valve body 12. A washer 78 is disposed between the valve body 12 and the threaded cap 80 and provides a seal between the threaded cap 80 and the valve body 12. The threaded cap 80 includes a test port 86 and a strainer fitting 88 for providing access to fluid in the valve body 12 without disassembling the device 10. The test port 86 includes inner threads 90 and the strainer fitting 88 includes matching outer threads 92 for attaching the strainer fitting 88 to the threaded cap 80.

The strainer fitting 88 provides the device 10 with blow down capability for flushing out debris accumulated in the strainer 76. By closing the ball valve assembly 14 thereby preventing fluid flow through the inlet 20 and removing the strainer fitting 88 from the test port 86, a reverse fluid flow through the device is created which forces any debris collected in the strainer 76 out the test port 86. A small ball valve (not shown) may be used in place of the strainer fitting 88 to facilitate back flushing the strainer 76 in this manner.

FIGS. 2 and 3 show that the fluid flow control assembly 18 comprises a flow control cartridge 94 which is placed in the flow control valve channel 18a of the valve body 12 through the flow control valve orifice 24 and is held in place by a spring 96 and a cap 98. A washer 100 and a ring 102 are, respectively, placed between the flow control cartridge 94 and the valve body 12 and between the spring 96 and the cap 98. The washer 100 and ring 102 provide seals between the components of the flow control assembly 18.

The flow control valve orifice 24 includes inner threads 104 and the cap 98 has matching outer threads 106 for attaching the cap 98 to the valve body 12 thereby holding the flow control cartridge 94 in place by holding the spring 96 against it. The cap 98 includes a test port 108 and a first test valve fitting 110 for providing access to fluid in the valve body 12 without disassembling the device 10. The test port 108 includes inner threads 112 and the first test valve fitting 110 includes matching outer threads 114 for attaching the first test valve fitting 110 to the cap 98.

Shown further in FIGS. 2 and 3, the test valve orifice 26 includes inner threads 116 and a second test valve 118 which has matching outer threads 120 for attaching the second test valve 118 to the valve body 12. As mentioned above, the test valve orifice 26 provides a port through which fluid interior to the valve body 12 and beyond the flow control assembly 18 may be tested. The second test valve 118 provides such access without dismantling the entire device 10.

Also shown in FIGS. 2 and 3, the outlet orifice 22 includes an outlet fitting 122 which is held in place by a coupling 124. The outlet orifice 22 has outer threads 126 and the coupling 124 has matching inner threads 128 of attaching the coupling 124 to the valve body 12 thereby holding the outlet fitting 122 in the valve body 12. A washer 130 is situated between the valve body 12 and the outlet fitting 122 and provides a seal. The coupling 124 can be a union or a compression fitting to allow, with the outlet fitting 122, ease of installation of the device 10 and connection to different sized pipes (not threaded), or a threaded outlet fitting could be used.

While an embodiment of the present invention has been shown and described, various modifications may be made without departing from the scope of the represent invention, and all such modification sand equivalents are intended to be covered.

What is claimed is:

1. A flow control device comprising a unitary body member which houses the following
   a first valve assembly contained within the body member for opening or closing the device to fluid flow,
   a strainer contained within the body member for straining fluid which flows through the device before said fluid reaches a second valve assembly, and
   a removable flow control valve assembly comprising the second valve assembly contained within the body member for receiving strained fluid flow and automatically controlling said fluid flow within the device.

2. The device of claim 1 wherein the body is substantially in the shape of a "Z."

3. A flow control device comprising
   a unitary body member, and the following components mounted in the body member,
   a first valve assembly comprising a ball valve assembly for opening or closing the device to fluid flow,
   a strainer for straining fluid which flows through the device before said fluid reaches a second valve assembly, and
   a removable flow control valve assembly comprising the second valve assembly for automatically controlling said fluid flow within the device,
   the body member further comprising a port for providing access to the strainer and a port for providing access to the flow control valve assembly.

4. A flow control and straining device comprising
   a ball valve assembly for opening and closing he device to fluid flow,
   a strainer for straining fluid which flows through the device,
   a removable flow control valve assembly for automatically controlling fluid flow within the device, and
   a unitary body for housing the ball valve assembly, the strainer, and the flow control valve assembly, and means for directing fluid flow first through the ball valve assembly, then through the strainer, and then through the flow control valve assembly.

5. A flow control device comprising
   a unitary body member substantially in the step of a "Z," and the following components mounted in the body member,
   a first valve assembly comprising a ball valve assembly for opening or closing the device to fluid flow,
   a strainer for straining fluid which flows through the device before said fluid reaches a second valve assembly, and
   a removable flow control valve assembly comprising the second valve assembly for automatically controlling said fluid flow within the device,
   the body member further comprising a port for providing access to the strainer and a port for providing access to the flow control valve assembly.

6. A flow control and straining device comprising
   a ball valve assembly for opening and closing the device to fluid flow,
   a strainer for straining fluid which flows through the device,
   a removable flow control valve assembly for automatically controlling fluid flow within the device, and
   a unitary body substantially in the shape of a "Z" for housing the ball valve assembly, the stainer, and the flow control valve assembly, and means for directing fluid flow first through the ball valve assembly, then through the strainer, and then through the flow control valve assembly.

* * * * *